United States Patent [19]

Ayers et al.

[11] 4,174,242
[45] Nov. 13, 1979

[54] TIME DELAY BEFORE POST CURE INFLATION

[75] Inventors: Myron T. Ayers; William J. Corsaut, both of Akron, Ohio

[73] Assignee: The General Tire & Rubber Company, Akron, Ohio

[21] Appl. No.: 950,505

[22] Filed: Oct. 11, 1978

Related U.S. Application Data

[63] Continuation of Ser. No. 770,962, Feb. 22, 1977, abandoned.

[51] Int. Cl.$^2$ .............................................. B29H 5/00
[52] U.S. Cl. ............................ 156/110 R; 156/123 R; 264/237; 264/326; 264/348; 425/28 P
[58] Field of Search .................. 156/110 R, 123 R; 425/28 P, 38, 48, 40, 44, 29, 30, 33; 264/232, 235, 86, 315, 316, 326, 237, 340, 345, 348

[56] References Cited

U.S. PATENT DOCUMENTS

| | | | |
|---|---|---|---|
| 2,715,245 | 8/1955 | Soderquist | 425/30 |
| 2,978,741 | 4/1961 | Soderquist | 425/28 P |
| 3,002,228 | 10/1961 | Salem et al. | 264/315 |
| 3,008,180 | 11/1961 | Woodhall | 425/38 |
| 3,039,839 | 6/1962 | Waters et al. | 425/44 |
| 3,214,791 | 11/1965 | Ericson et al. | 425/28 P |
| 3,487,507 | 1/1970 | Turk | 425/29 |
| 3,621,520 | 11/1971 | Ulm | 425/28 P |
| 3,645,660 | 2/1972 | Hugger et al. | 425/28 P |
| 3,667,881 | 6/1972 | Cimprich | 425/28 P |
| 3,852,008 | 12/1974 | Shichman | 425/28 P |

*Primary Examiner*—John E. Kittle

[57] ABSTRACT

Tires made using nylon cord in the fabric plies are built in a conventional manner, cured in a conventional manner in a curing press, removed from the curing press and held in an uninflated state for from 4 to 7 minutes, then post inflated. The tires remain in the inflated state until the temperature has been reduced below the heat shrink temperature of the nylon cord.

The cords in the tires which have been subjected to the post inflation treatment of the present invention have higher tensile strength than cords in tires which have been post inflated both in and out of the mold immediately after curing and tires which were not post inflated.

2 Claims, 1 Drawing Figure

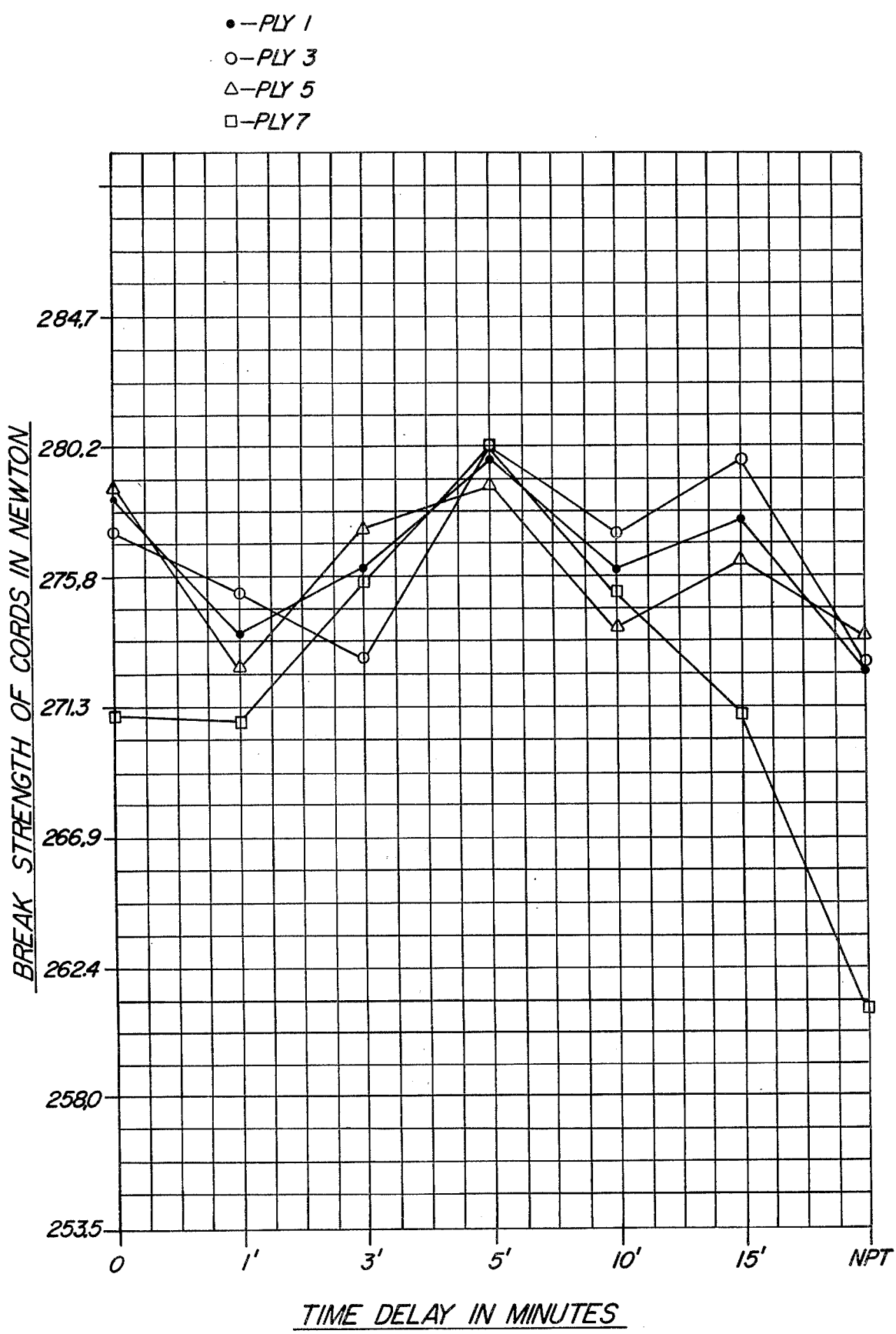

TIME DELAY BEFORE POST CURE INFLATION

This is a continuation of application Ser. No 770,962 filed Feb. 22, 1977 now abandoned.

BACKGROUND OF THE INVENTION

1. Field of the Invention

This invention is directed to a method of inflating tires after the tires have been removed from the curing press, more specifically from 4 to 7 minutes after the tires have been removed from the curing press.

2. Description of the Prior Art

The advent of the nylon tire cord ushered in a new era of tire building technology. Tires made with the new cord were of lighter weight and higher strength than the previous cotton or rayon cord tires. With the new era of high strength cord tires, however, came a new set of problems.

One of the problems was that the nylon cord would stretch while the tire was in service and the rubber did not. This phenomenon resulted in cracks in the rubber, particularly in the grooves of the tire tread during normal service. To remedy this problem, nylon cords having an elastic memory were pre-stressed at a temperature above its heat shrink termperature, cooled below its heat shrink temperature in its stressed state and then used in tire building. This resulted in reduced subsequent stretching of the nylon cord.

Another problem which occurred was that shrinkage of the nylon cord caused distortion of the tire when a hot nylon tire was removed from the mold.

Developments designed to reduce the groove cracking and heat distortion problems included method and apparatus for inflating tires immediately after curing. The prior art, in this era is exemplified by the disclosures of U.S. Pat. Nos. 3,002,228 Salem, et al. (1961); 3,008,180 Woodhall (1961); 3,039,839 Waters, et al. (1961); 2,978,741 Soderquist (1961); and 3,487,507 Turk (1970).

SUMMARY OF THE INVENTION

While the inventions directed to post inflating tires described above in the Description of the Prior Art were effective in reducing or eliminating some of the problems generated by the use of nylon cord, they had an adverse effect on the break strength of the nylon cord used.

The present invention is based upon the discovery that the break strength of the nylon cord used in making tires is higher in the finished tire if a time delay of from 4 to 7 minutes is employed between the curing of the tire in the curing press and the post inflation of the tire than if no delay is employed.

BRIEF DESCRIPTION OF THE DRAWING

The FIGURE shows how the break strength of nylon cord, used in building tires, varies with the delay between the curing step and the post inflation step.

DESCRIPTION OF THE PREFERRED EMBODIMENTS

In the practice of the present invention, all of the process steps and all of the equipment is conventional with the exception of the time delay between the curing of the tire in the mold and the post inflation step.

The conventional steps comprise curing a nylon cord tire under heat and pressure in a mold then post inflating the tire outside of the mold to a pressure of at least 170 kilopascals before the tire cools below the heat shrink temperature of the nylon cord. The inventive step of the process comprises a delay of from 4 to 7 minutes between the time of removal of the tire from the mold and the time the tire is post inflated. The preferred delay time is from 4 to 6 minutes as the breaking strength of the nylon cord used to reinforce the tire is at a maximum value about that time.

It is believed that nylon filaments used in the manufacture of tires are normally stretched in their manufacture about 400% to orient the filaments. Various tire manufacturers either stretch or have the cords stretched an additional 12% or so in order to prevent the cords from becoming longer in use. It is preferred that a tension be maintained in the nylon cord to prevent cracks from forming in the rubber tire carcass.

The tire molds used in the practice of the present invention are also conventional and are operated in the well-known Bag-O-Matic Vulcanizers illustrated in Soderquist U.S. Pat. No. 2,715,245. The Bag-O-Matic Vulcanizers are sold by the McNeil Machine and Engineering Company of Akron, Ohio.

In the practice of the present invention it is preferred that during the delay and the cooling period that the tread and sidewalls of the tire be free and out of contact with any support or element which would prevent the tire from assuming and holding its fully rounded shape during the cooling period. It is preferred that the tire be supported solely by the inextensible bead edges of the tire. Apparatus for accomplishing this support is shown in U.S. Pat. Nos. 2,978,741 of Soderquist; 3,002,228 of Salem, et al,; and 3,039,839 of Waters, et al.

While it is preferred that the tire treads and sidewall be free of contact with support, it is not critical nor necessary for the practice of the present invention. In the conventional post inflation step the tire can be inflated to a pressure of from 170 to 1400 kiolpascals and preferably the tire is inflated to a pressure of from 350 to 1200 kilopascals. The inflation pressure is preferably maintained within the tire until the tire carcass cools to an average temperature of from 10° to 130° C. and preferably from 20° to 80° C.

In order to establish the parameters of the present invention three different groups of tires were made. Each group contained three or more tires. The tires which were made were 11×22.5 8-ply truck tires. The tires were conventional American tubeless truck tires using the conventional 1976 American nomenclature. The tires were breakerless. Assembly of the tires was accomplished by conventional means familiar to those acquainted with the state of the art. The nylon cords used in building the tires contained two plies of 840 filaments each. Each cord had a diameter of 0.2 mm and was pre-stretched about 12%.

Each green tire was then cured in the conventional manner by first, injecting high pressure steam into the bladder, then injecting steam into the jacket of the vulcanizer fillowed by high pressure hot water into the bladder. At the termination of the cure cycle, cold water was circulated throughout the bladder and the bladder was evacuated by vacuum and each tire was removed from the press. Each tire was then stored for the appropriate length of time prior to the post inflation step. Three tires from each group were held 1, 3, 5, 10, 15 and 50 minutes prior to post inflation. Each tire was then post inflated and remained post inflated until the average temperature of each tire carcass dropped to 77°

C. Ten cords from each alternate ply of each tire, i.e., plies 1, 3, 5 and 7, were then removed from each tire and pulled until they broke. The force at break was measured for each cord in each tire and the average value for each set of ten cords in each ply was calculated. The correlation between the time delay between the time of the removal of the tire from the mold to the time the tire was post inflated and the average break strength of the cords per ply is shown in the drawing.

An analysis of the graph of the drawing shows that not only do all the cords of the plies tested reach a maximum break strength after 5 minutes delay, but also that the break strength of all the cords tested is approximately the same maximum value. This equality of break strengths of the cords is probably just as important as the high values achieved. This equality of break strength means that one ply is not significantly weaker than another ply. Weakness in one ply could lead to failure in the ply due to cord breakage. Cord breakage in one ply would shift the tension to the other plies thereby tending to cause breakage in the next weakest ply and so forth, thereby ruining the tire assuming all other factors such as stress and modulus to be equal.

The invention is not to be limited to the specific nylon cords, nor the number of filaments per cord set forth in the specific example given.

We claim:

1. In a method of curing a nylon cord tire under heat and pressure in a mold, then post inflating the tire outside of the mold to a pressure of at least 170 kilopascals before the tire cools below the heat shrink temperature of the nylon cord, the improvement which comprises a delay of from 4 to 7 minutes between the time of removal of the tire from the mold and the time the tire is post inflated.

2. The method of claim 1 wherein the delay is about 4 to 6 minutes.

* * * * *